US010848982B2

(12) United States Patent
Fujii

(10) Patent No.: US 10,848,982 B2
(45) Date of Patent: Nov. 24, 2020

(54) COMMUNICATION TERMINAL APPARATUS, SATELLITE BASE STATION, BASE-STATION CONTROL APPARATUS AND MOBILE COMMUNICATION SYSTEM

(71) Applicant: SoftBank Corp., Tokyo (JP)

(72) Inventor: Teruya Fujii, Tokyo (JP)

(73) Assignee: SoftBank Corp., Tokyo (JP)

(*) Notice: Subject to any disclaimer, the term of this patent is extended or adjusted under 35 U.S.C. 154(b) by 79 days.

(21) Appl. No.: 16/084,699

(22) PCT Filed: Jan. 31, 2017

(86) PCT No.: PCT/JP2017/003466
§ 371 (c)(1),
(2) Date: Sep. 13, 2018

(87) PCT Pub. No.: WO2017/159086
PCT Pub. Date: Sep. 21, 2017

(65) Prior Publication Data
US 2019/0090141 A1    Mar. 21, 2019

(30) Foreign Application Priority Data

Mar. 14, 2016   (JP) ................................ 2016-049573

(51) Int. Cl.
*H04W 16/28* (2009.01)
*H04W 84/06* (2009.01)
(Continued)

(52) U.S. Cl.
CPC ........ *H04W 16/28* (2013.01); *H04B 7/18519* (2013.01); *H04B 7/18539* (2013.01);
(Continued)

(58) Field of Classification Search
None
See application file for complete search history.

(56) References Cited

U.S. PATENT DOCUMENTS

2011/0044237 A1* 2/2011 Oh ................... H04B 7/2041
370/326
2013/0148571 A1   6/2013 Miller
(Continued)

FOREIGN PATENT DOCUMENTS

JP   2013-12976 A    1/2013
JP   2014-064219 A   4/2014
(Continued)

OTHER PUBLICATIONS

Tadashi Minowa, et al., "Satellite/Terrestrial Integrated Mobile Communication System for Nation's Security and Safety," Institute of Electronics, Information, and Communication Engineers, B vol. J91-B, No. 12, pp. 1629-1640, 2008.

*Primary Examiner* — Lonnie V Sweet
(74) *Attorney, Agent, or Firm* — Muirhead and Saturnelli, LLC

(57) ABSTRACT

A communication terminal apparatus, a terrestrial cellular base station and a mobile communication system are provided, which are capable of being shared in a terrestrial cellular mobile communication system and a satellite mobile communication system, and preventing an interference between beams in a satellite mobile communication system while preventing an interference between both systems by a simple switching control of radio resources. Time slots of radio resources are allocated so as not to overlap with each other between the terrestrial cellular mobile communication system and the satellite mobile communication system and so as not to overlap with each other between adjacent beams corresponding to each of two or more beams of the satellite mobile communication system. When locating in a beam area covered by any one of two or more beams of the satellite mobile communication system, a radio communication of the satellite mobile communication system is performed using the time slots allocated to the beam covering the beam area.

20 Claims, 8 Drawing Sheets

(51) Int. Cl.

| | |
|---|---|
| *H04W 16/04* | (2009.01) |
| *H04W 16/14* | (2009.01) |
| *H04B 7/185* | (2006.01) |
| *H04W 24/02* | (2009.01) |
| *H04W 72/04* | (2009.01) |
| *H04W 84/04* | (2009.01) |
| *H04B 7/204* | (2006.01) |

(52) U.S. Cl.
CPC ....... *H04B 7/18563* (2013.01); *H04B 7/2041* (2013.01); *H04W 16/04* (2013.01); *H04W 16/14* (2013.01); *H04W 24/02* (2013.01); *H04W 72/0446* (2013.01); *H04W 84/042* (2013.01); *H04W 84/06* (2013.01)

(56) References Cited

U.S. PATENT DOCUMENTS

2013/0315112 A1* 11/2013 Gormley ............... H04W 16/14
　　　　　　　　　　　　　　　　　　　　　　　　　370/280
2016/0345189 A1　 11/2016 Miyagawa et al.
2017/0006620 A1* 1/2017 Reis ........................ H04L 43/16

FOREIGN PATENT DOCUMENTS

| WO | WO 2008/116075 A1 | 9/2008 |
|---|---|---|
| WO | WO 2015/114729 A1 | 8/2015 |

* cited by examiner

COMMUNICATION TERMINAL APPARATUS, SATELLITE BASE STATION, BASE-STATION CONTROL APPARATUS AND MOBILE COMMUNICATION SYSTEM

TECHNICAL FIELD

The present invention relates to a mobile communication system, and a communication terminal apparatus, a satellite base station and a base-station control apparatus in the mobile communication system.

BACKGROUND ART

A communication terminal apparatus is conventionally known, which is capable of using a terrestrial cellular mobile communication system (hereinafter abbreviated as "terrestrial system" as appropriate) via a cellular base station located on the ground and a satellite mobile communication system (hereinafter abbreviated as "satellite system" as appropriate) via an artificial satellite in a same area (for example, refer to Non-Patent Literature 1 and Patent Literature 1).

CITATION LIST

Patent Literature

Patent Literature 1: Japanese Unexamined Patent Application Publication No. 2014-064219.

Non-Patent Literature

Non-Patent Literature 1: Tadashi Minowa and six others, "Satellite/Terrestrial Integrated Mobile Communication System for Security and Safety", The Transactions of the Institute of Electronics, Information and Communication Engineers B, Vol. J91-B, No. 12, pp. 1629-1640, 2008/12.

SUMMARY OF INVENTION

Technical Problem

As the antenna configuration of the artificial satellite of the satellite system, there are a single beam antenna configuration covering the terrestrial communication service area with one beam and a multi-beam antenna configuration covering the ground communication service area with two or more beams. In a communication terminal apparatus that can be shared in the foregoing terrestrial system and the satellite system using an artificial satellite with the multi-beam antenna configuration among the two kinds of antenna configurations, there is a problem to avoid an interference between the beams in the satellite mobile communication system while avoiding an interference between both systems by a simple switching control of radio resources.

Solution to Problem

DESCRIPTION

A communication terminal apparatus according to one aspect of the present invention is a communication terminal apparatus shared in a terrestrial cellular mobile communication system and a multi-beam type of satellite mobile communication system, comprises memory means for memorizing allocation information on time slots of radio resources allocated to the terrestrial cellular mobile communication system and the satellite mobile communication system in which a same frequency band is used, so as not to overlap with each other between the systems, and allocated to each of two or more beams of the satellite mobile communication system so as not to overlap with each other between adjacent beams, transceiving means for performing a radio communication by selecting a terrestrial cellular mobile communication method when using the terrestrial cellular mobile communication system and performing a radio communication by selecting a satellite mobile communication method when using the satellite mobile communication system, and control means for controlling to perform a radio communication of the satellite mobile communication system by using time slots allocated to a beam covering a beam area when the communication terminal apparatus is located in the beam area covered by the beam that is one of the two or more beams of the satellite mobile communication system, based on the allocation information on the time slots of radio resources.

A satellite base station according to another aspect of the present invention is a satellite base station capable of performing a radio communication with a communication terminal apparatus in a mobile communication system including a terrestrial cellular mobile communication system and a satellite mobile communication system via a communication relay device of an artificial satellite, and comprises memory means for memorizing allocation information on time slots of radio resources allocated to the terrestrial cellular mobile communication system and the satellite mobile communication system in which a same frequency band is used, so as not to overlap with each other between the systems, and allocated to each of two or more beams of the satellite mobile communication system so as not to overlap with each other between adjacent beams, transceiving means for performing a radio communication with a communication terminal apparatus located in a beam area covered by one of beams of an own base station by a satellite mobile communication method, and control means for controlling to perform a radio communication of the satellite mobile communication system by using time slots allocated to a beam covering a beam area when the communication terminal apparatus is located in the beam area covered by the beam that is one of the plurality of beams of the satellite mobile communication system, based on the allocation information on the time slots of radio resource.

A base-station control apparatus according to yet another aspect of the present invention is a base-station control apparatus for controlling a terrestrial cellular base station capable of performing a radio communication with a communication terminal apparatus and a satellite base station capable of performing a radio communication with a communication terminal apparatus via a communication relay apparatus of an artificial satellite in a mobile communication system including a terrestrial cellular mobile communication system and a satellite mobile communication system. A same frequency band is used for a radio communication in each of the terrestrial cellular mobile communication system and the satellite mobile communication system. The base-station control apparatus comprises control means for controlling to allocate time slots of radio resources used in the terrestrial cellular mobile communication system and time slots of radio resources used in the satellite mobile communication system so as not to overlap with each other between the systems, and to allocate time slots corresponding to each of two or more beams of the satellite mobile communication system so as not to overlap with each other between adjacent beams.

According to the communication terminal apparatuses, the satellite base station and the base-station control apparatus, when the communication terminal apparatus is located in the beam area covered by one of the two or more beams of the satellite mobile communication system, a radio communication of the satellite mobile communication system is performed by using the time slots allocated to the beam covering the coverage beam area. The time slots allocated to the beam covering the beam area in which the communication terminal apparatus is located not only does not overlap with the time slots allocated to the terrestrial cellular mobile communication system, but also does not overlap with the time slots allocated to a beam adjacent to the beam of the beam area. Therefore, it is possible to avoid an interference due to signals of the terrestrial cellular mobile communication system and to avoid an interference due to signals in the adjacent beam of the satellite mobile communication system. Furthermore, since the radio resources of the satellite mobile communication system, which is controlled so as to switch between the mutually adjacent beams in the satellite mobile communication system, are easily controllable time slot, the switching control of radio resources is easier than when a control is performed so as to switch frequencies.

In the communication terminal apparatus, the control means may control so as to change the number of time slots corresponding to each of the two or more beams of the satellite mobile communication system in accordance with a traffic amount in the beam area covered by each of the beams.

In the satellite base station, the control means may control so as to change the number of time slots corresponding to each of the two or more beams of the satellite mobile communication system in accordance with a traffic amount in the beam area covered by each of the beams.

In the base-station control apparatus, the control means may control so as to change the number of time slots corresponding to each of the two or more beams of the satellite mobile communication system in accordance with a traffic amount in the beam area covered by each of the beams.

According to the communication terminal apparatus, the satellite base station and the base-station control apparatus, when the traffic amount in the beam area covered by one of the beams of the satellite mobile communication system is large, by increasing the number of time slots allocated to the beam of the beam area, it is possible to increase a spectral efficiency in the beam area so as to cope with the increase in traffic amount. Moreover, when the traffic amount in the beam area covered by one of the beams of the satellite mobile communication system is small, by reducing the number of time slots allocated to the beam of the beam area, unnecessary allocation of time slots can be avoided.

In the communication terminal apparatus, the control means may control so as to change the number of time slots allocated to each of the terrestrial cellular mobile communication system and the satellite mobile communication system according to a traffic amount in at least one of the terrestrial cellular mobile communication system and the satellite mobile communication system.

In the base-station control apparatus, the control means may control so as to change the number of time slots allocated to each of the terrestrial cellular mobile communication system and the satellite mobile communication system according to a traffic amount in at least one of the terrestrial cellular mobile communication system and the satellite mobile communication system.

According to the communication terminal apparatus and the base-station control apparatus, when the traffic amount in the beam area, in which the satellite mobile communication system is used, becomes large, by increasing the number of time slots allocated to the satellite mobile communication system, it is possible to increase a spectral efficiency so as to cope with the increase in traffic amount. Moreover, when the traffic amount in the beam area, in which the satellite mobile communication system is used, becomes small, by reducing the number of time slots allocated to the satellite mobile communication system and the beam area, unnecessary allocation of time slots can be avoided.

A mobile communication system according to still another aspect of the present invention, which is a mobile communication system including a terrestrial cellular mobile communication system and a satellite mobile communication system, comprises a terrestrial cellular base station capable of performing a radio communication with a communication terminal apparatus, a satellite base station capable of performing a radio communication with a communication terminal apparatus via a communication relay apparatus of an artificial satellite, and a base-station control apparatus that controls the terrestrial cellular base station and the satellite base station. The terrestrial cellular base station is any one of the terrestrial cellular base stations in the above-described aspects.

Furthermore, a mobile communication system according to still another aspect of the present invention, which is a mobile communication system including a terrestrial cellular mobile communication system and a satellite mobile communication system, comprises a terrestrial cellular base station capable of radio communication with a communication terminal apparatus, a satellite base station capable of radio communication with a communication terminal apparatus via a communication relay apparatus of an artificial satellite, and any one of the terrestrial cellular base stations in the above-described aspects Advantageous Effects of Invention According to the present invention, it is capable of sharing the terrestrial cellular mobile communication system and the satellite mobile communication system, and avoiding an interference between the beams in the satellite mobile communication system while avoiding an interference between both systems by a simple switching control of radio resources.

DESCRIPTION OF EMBODIMENTS

Hereinafter, various embodiments of the present invention will be described with reference to the drawings.

Figure 1:
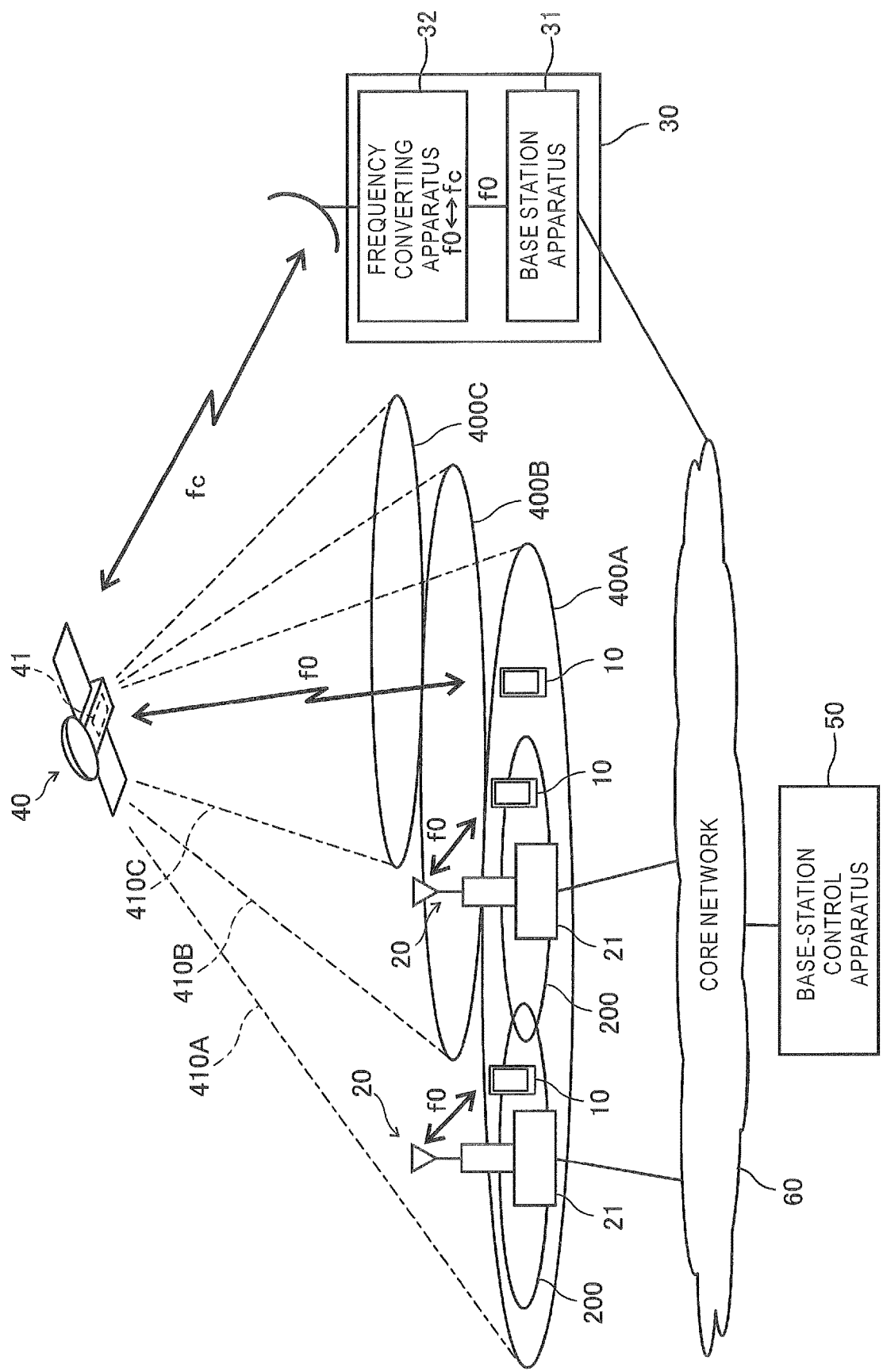
FIG. 1 is an illustration showing an example of an overall configuration of a mobile communication system using a communication terminal apparatus according to an embodiment of the present invention.

FIG. 1 is an illustration showing an example of an overall configuration of a mobile communication system (mobile phone system) using a communication terminal apparatus according to an embodiment of the present invention. The communication terminal apparatus 10 of the present embodiment can use a multi-beam type of terrestrial system (terrestrial cellular mobile communication system) via a terrestrial cellular base station and a satellite system (satellite mobile communication system) via an artificial geostationary satellite. It is noted that, in the present embodiment, a communication operation mode when the communication terminal apparatus 10 communicates by using the terrestrial system is called a "terrestrial communication mode", and a communication operation mode when the communication terminal apparatus 10 is communicates by using the satellite system is called a "satellite communication mode". In the present embodiment, although cases where the artificial satellite used in the satellite mobile communication system is a geostationary satellite (hereinafter called as "artificial geostationary satellite") will be described, an artificial satellite such as a non-geostationary satellites and a quasi-zenith satellite other than the artificial geostationary satellite may be used in the satellite mobile communication system.

In FIG. 1, the mobile communication system of the present embodiment is provided with a base station 20 (hereinafter called as "terrestrial cellular base station") capable of performing a radio communication with the communication terminal apparatus 10 via the terrestrial system, and a satellite base station 30 capable of performing a radio communication with the communication terminal apparatus 10 via a communication relay apparatus 41 of a multi-beam type of artificial geostationary satellite 40 as a satellite relay station. A base station apparatus 21 of the terrestrial cellular base station 20, a base station apparatus 31 of the satellite base station 30 and a base-station control apparatus 50 for controlling each of the base stations are respectively connected to a core network 60 via a wired communication line consisting of a leased line, a general-purpose line, etc.

The same radio transmission method and the same frequency band are used for the radio communication between the communication terminal apparatus 10 and each of the terrestrial cellular base station 20 and the communication relay apparatus 41 of the artificial geostationary satellite 40. As a radio transmission method, for example, a communication method of the third generation mobile communication system (3G) such as a WCDMA (registered trademark) (Wideband Code Division Multiple Access) and a CDMA-2000, a communication method of LTE (Long Term Evolution) and LTE-Advanced, a communication method of the fourth generation mobile telephone, etc. can be adopted. Moreover, as a frequency band of radio communication (service link) with the communication terminal apparatus 10, for example, a frequency band of a predetermined band (for example, 30 MHz) in the MSS band (1,980 to 2,010 MHz for uplink and 2,170 to 2,200 MHz for downlink) that is standardized by the IMT (International Mobile Telecommunication) -2000 can be allocated. Furthermore, as a frequency band of radio communication (feeder link) between the communication relay apparatus 41 of the artificial geostationary satellite 40 and the satellite base station 30 on the ground, for example, a frequency band of a predetermined band in the Ku band (14 GHz for uplink and 12 GHz for downlink) can be allocated.

The communication terminal apparatus 10 is a mobile telephone, a smart-phone or a portable personal computer, etc. having a mobile communication function, and is also called as a user equipment (UE), a mobile apparatus, a mobile station apparatus or a portable communication terminal. For example, when the communication terminal apparatus 10 is located in an area where the area (hereinafter called as "terrestrial station area") 200 in which a radio communication can be performed with the terrestrial cellular base station 20 and the areas (hereinafter called as "satellite station areas") 400A, 400B and 400C in which a radio communication can be performed with the communication relay apparatus 41 of the artificial geostationary satellite 40 are overlapped, the communication terminal apparatus 10 can use the terrestrial system and the satellite system. It is noted that, in this overlapping area, since strength (received power) of signal received from the terrestrial cellular base station 20 is high, the communication terminal apparatus 10 preferentially uses the terrestrial system. Moreover, when the communication terminal apparatus 10 is located in an area outside the terrestrial station area 200 and within the satellite station areas 400A, 400B and 400C, the communication terminal apparatus 10 can use the satellite system.

The terrestrial cellular base station 20 is provided with the base station apparatus 21 and an antenna, etc. and is capable of communicating with the communication terminal apparatus 10 at the frequency f0 within the aforementioned predetermined frequency band by using a predetermined radio transmission method (modulation method). As the terrestrial cellular base station 20, for example, a macro base station for wide area which covers a macro cell being as a normal wide area with a radius from about several hundred meters to several kilometers and a small base station provided to cover a smaller area (for example, pico cell and femto cell) than the area covered by the wide area macro base station can be exemplified. The macro base station may be referred to as "macro-cell base station", "Macro e-Node B", or the like, and the small base station may also be referred to as "small-cell base station", "Micro-cell base station".

The satellite base station 30 is provided with a base station apparatus 31 similar to the base station apparatus 21 of the terrestrial cellular base station 20, a frequency converting apparatus 32, and an antenna, etc. and may also be referred to as "feeder link station". Using the predetermined radio transmission method (modulation method) similar to the terrestrial cellular base station 20, the satellite base station 30 can communicate with the communication relay apparatus 41 of the artificial geostationary satellite 40 by converting the frequency f0 to the frequency fc for the satellite communication. When relaying a communication between the base station apparatus 31 and the communication relay apparatus 41 of the artificial geostationary satellite 40, the frequency converting apparatus 32 functions as frequency converting means for performing a conversion between the frequency f0 used in the base station apparatus 31 and the frequency fc for satellite communication used for communication of the communication relay apparatus 41 of the artificial geostationary satellite 40.

The communication relay apparatus 41 of the artificial geostationary satellite 40 has frequency converting means for performing a non-regenerative frequency conversion relay. When relaying a communication between the communication terminal apparatus 10 and the satellite base station 30, the frequency converting means performs a conversion between the frequency f0 used for communication with the communication terminal apparatus 10 and the frequency fc for satellite communication used for communication with the satellite base station 30. For example, the communication relay apparatus 41 can communicate with the communication terminal apparatus 10 at the frequency f0 by converting the frequency fc of the signal received from the satellite base station 30 to the frequency f0.

The base-station control apparatus 50 may control an allocation of radio resources (frequency, time slot) with respect to the terrestrial cellular base station 20 and the satellite base station 30 corresponding to a common area to which at least a part of areas capable of performing a radio communication with the communication terminal apparatus 10. That is, the base-station control apparatus 50 performs a control to allocate radio resources used in the terrestrial cellular base station 20 and radio resources used in the satellite base station 30 so that they do not overlap with each other. Moreover, in an emergent condition in which a failure occurs in some of the terrestrial cellular base stations 20 due to a disaster or the like, the base-station control apparatus 50 may also control to increase the radio resource (for example, time slot) allocated for the satellite base station 30 so as to be more than that in a normal condition. For example, in an emergent condition in which a failure occurs in some of the terrestrial cellular base stations 20 due to a disaster or the like, the base-station control apparatus 50 controls to increase an allocation rate of radio resources (for example, time slots) allocated to the satellite base station 30 so as to be more than that in a normal condition. These controls may be performed, for example, by transmitting a predetermined control data from the base-station control apparatus 50 to the terrestrial cellular base station 20 and the satellite base station 30. Here, the "allocation rate" of radio resources allocated to the satellite base station 30 is a ratio of radio resources allocated to the satellite base station 30 in radio resources allocated to all of the terrestrial cellular base station 20 and the satellite base station 30 in the common area.

In particular, in the present embodiment, the base-station control apparatus 50 performs a control to allocate time slots of the radio resource used in the terrestrial cellular base station 20 and time slots of the radio resource used in the satellite base station 30 so that they do not overlap with each other. The time slot of radio resource is a time interval obtained by dividing a radio communication frame of a predetermined time length by a predetermined number, and a basic unit of temporal allocation control of the radio resources. For example, when a radio communication frame of the radio resource allocated to all of the terrestrial cellular base station 20 and the satellite base station 30 is divided into 8 or 10, the 8 or 10 time slots in the radio communication frame are allocated so that the time slots do not overlap between the terrestrial cellular base station 20 and the satellite base station 30.

Allocation information on the radio resource (time slot) allocated to each of the terrestrial system and the satellite system is sent from the base-station control apparatus 50 to the terrestrial cellular base station 20 and the satellite base station 30 respectively, and memorized in a memory device of each base station 20 and 30. Each of the terrestrial cellular base station 20 and the satellite base station 30 performs downlink and uplink communications with the communication terminal apparatus 10 based on the allocation information on the radio resource (time slot). The allocation information on the radio resource (time slot) is sent, for example, from the terrestrial cellular base station 20 and the satellite base station 30 to the communication terminal apparatus 10, and memorized in the memory device of the communication terminal apparatus 10. The communication terminal apparatus 10 performs downlink and uplink communications with the terrestrial cellular base station 20 and the satellite base station 30 respectively based on the allocation information on the radio resource (time slot).

The communication terminal apparatus 10, the terrestrial cellular base station 20 and the satellite base station 30 in the present embodiment are timely synchronized with each other with a predetermined time accuracy (for example, 1 µs or less) so as to comply with the foregoing allocation control of the time slots of radio resource. This time synchronization may be performed, for example, by accessing a predetermined time server or receiving a signal from a GPS satellite.

The communication terminal apparatus 10 is configured with, for example, hardware such as a computer apparatus having a CPU, a memory, etc., and a radio communication section, and can perform a radio communication with the terrestrial cellular base station 20 and the satellite base station 30, by executing a predetermined program. The terrestrial cellular base station 20 and the satellite base station 30 are configured with, for example, hardware such as a computer apparatus having a CPU, a memory, etc., an external communication interface section for the core network 60, and a radio communication section, and can perform a radio communication with the communication terminal apparatus 10 and a communication with the core network 60 side, by executing a predetermined program. The base-station control apparatus 50 is configured with, for example, hardware such as a computer apparatus having a CPU, a memory, etc., an external communication interface section for the core network 60, and can perform a control of the terrestrial cellular base station 20 and the satellite base station 30, by executing a predetermined program.

Figure 2:
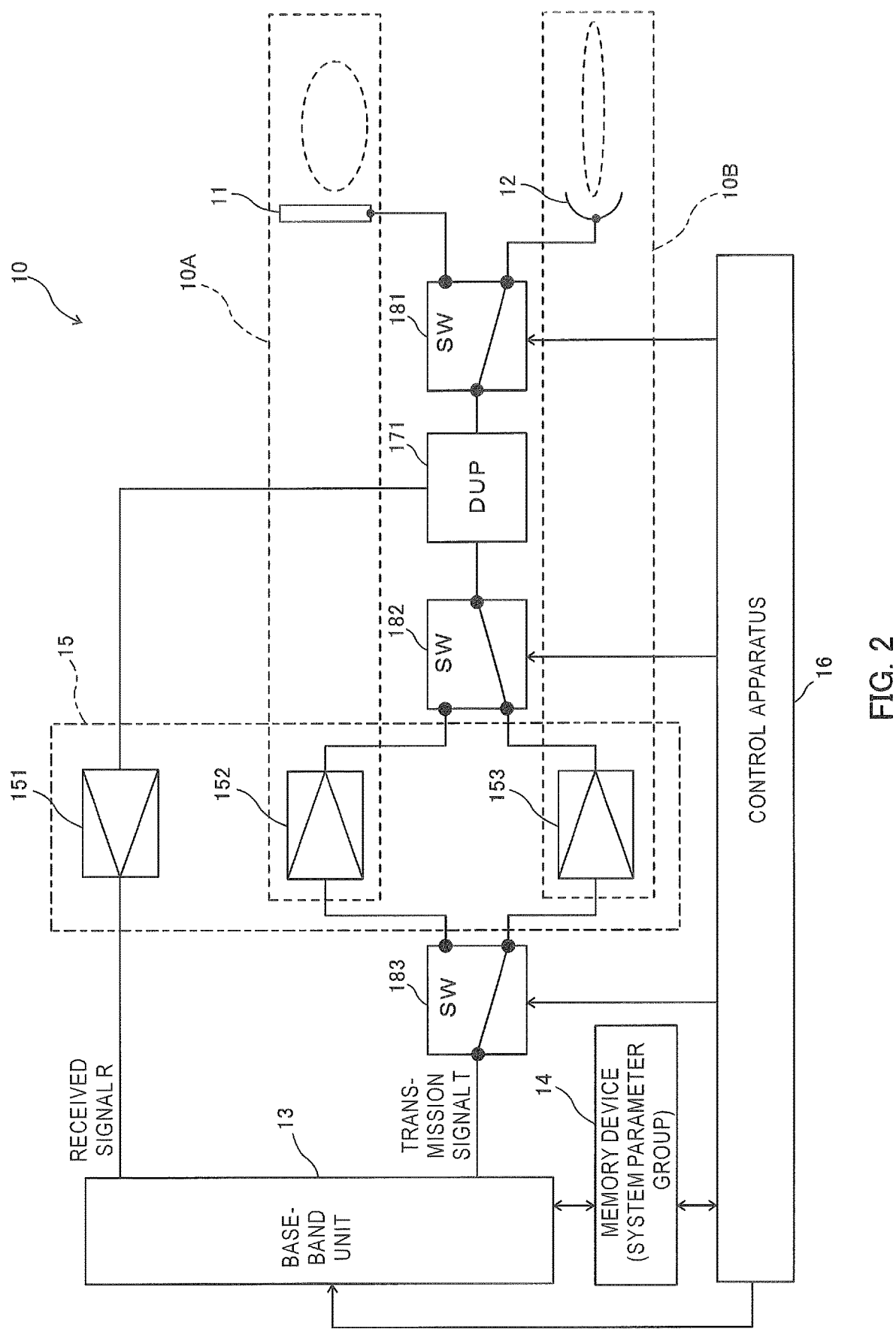
FIG. 2 is a block diagram showing a configuration example of a communication terminal apparatus according to the present embodiment.

FIG. 2 is a block diagram showing a configuration example of the communication terminal apparatus 10 according to the present embodiment. It is noted that, the configuration of the communication terminal apparatus 10 is not limited to the configuration of FIG. 2, however, may be any configuration as long as it can be used in the terrestrial system and the satellite system and can comply with an allocation control of time slots of the radio resource in the terrestrial system and the satellite system.

In FIG. 2, the communication terminal apparatus 10 is provided with a first antenna 11 used for a radio communication with the terrestrial cellular base station 20 in the terrestrial system, a second antenna 12 used for a radio communication with the artificial geostationary satellite 40 in the satellite system, and an antenna changeover switch (sw) 181 as antenna switching means. The first antenna 11 is, for example, a linear antenna corresponding to a vertically polarized wave of the terrestrial system, and the second antenna 12 is a helical antenna or a patch antenna corresponding to a circular polarized wave of the satellite system. The antenna changeover switch 181 switches between the first antenna 11 and the second antenna 12 depending on the selected terrestrial system or satellite system.

Furthermore, the communication terminal apparatus 10 is provided with a baseband unit 13 as shared baseband processing means, and a memory device 14 as memory means for memorizing a system parameter group used for the baseband unit 13. The baseband unit 13 performs a process of a downlink received signal R and an uplink transmission signal T based on the system parameter group consisting of a preset value for each of multiple types of system parameters that are commonly defined for the terrestrial system and the satellite system.

The baseband unit 13 performs a process of generating the uplink transmission signal T by modulating a transmission data of a predetermined time slot, and acquiring a data by demodulating the downlink received signal R of a predetermined time slot, based on a predetermined radio transmission method (for example, a radio transmission method specified by the 3GPP LTE or LTE-Advanced). For this processing in the baseband unit 13, the first system parameter group optimized for the terrestrial system or the second system parameter group optimized for the satellite system is used.

The memory device 14 memories the first system parameter group optimized for the terrestrial system and the second system parameter group optimized for the satellite system as a system parameter group used for the baseband unit 13. The multiple types of system parameters are, for example, a modulation method, a code rate of error correction code, a maximum number of retransmissions during a retransmission control, and transceiving buffer amount for accumulating a transceiving data. Moreover, the memory device 14 memories the aforementioned allocation information on the radio resources (time slots) allocated to the terrestrial system and the satellite system respectively.

Moreover, the communication terminal apparatus 10 is provided with power amplification means 15 for amplifying power of the received signal R to be input to the baseband unit 13 and the transmission signal T outputted from the baseband unit 13 respectively. The power amplification means 15 of the present configuration example is provided with a shared low noise reception power amplifier (hereinafter called as "reception power amplifier") 151 used for power amplification of the received signal R of the terrestrial system and the satellite system respectively, a first transmission power amplifier 152 used for power amplification of the transmission signal T of the terrestrial system, and a second transmission power amplifier 153 used for power amplification of the transmission signal T of the satellite system. The first transmission power amplifier 152 amplifies the power of the transmission signal T of the terrestrial system so that the transmission power becomes, for example, 0.2 [W]. The second transmission power amplifier 153 amplifies the power of the transmission signal T of the satellite system so that the transmission power becomes, for example, 1 [W].

In the configuration example of FIG. 2, the first antenna 11 and the first transmission power amplifier 152 are components 10A dedicated to the terrestrial system, and the second antenna 12 and the second transmission power amplifier 153 are components 10B dedicated to the satellite system.

The path of received signal R received by the antennas 11 and 12 and the path of transmission signal T to the antennas 11 and 12 are separated by the DUP (Duplexer) 171. Moreover, the path of the transmission signal T passing through the first transmission power amplifier 152 and the path of the transmission signal T passing through the second transmission power amplifier 153 are switched by the transmission path changeover switches (SW) 182 and 183.

Moreover, the communication terminal apparatus 10 is provided with a selection means for selecting any one of the terrestrial system or the satellite system, and a control apparatus 16 as control means for controlling to use the first system parameter group or the second system parameter group memorized in the memory device 14 for the baseband unit 13 according to the terrestrial system or the satellite system selected by the selection means. The control apparatus 16 is configured with, for example, CPU, and memory such as a RAM, a ROM, etc., and functions as the control means, by loading and executing a predetermined control program. The control apparatus 16 according to the present embodiment also functions as selection means for selecting any one of the terrestrial system or the satellite system based on a base station identifier included in the common control signal described below and the received power.

It is noted that, the communication terminal apparatus 10 may be provided with a display section such as a liquid crystal panel having a touch panel function connected to the control apparatus 16, and an operation section such as an operation button. In this case, the display section or the operation section may be used as selection means so that a user can arbitrarily select any one of the terrestrial system and the satellite system.

In the communication terminal apparatus 10 of the configuration example of FIG. 2, when the terrestrial system is selected, the received signal R of the predetermined time slot of the downlink from the terrestrial cellular base station 20 received by the first antenna 11 is amplified with the reception power amplifier 151, and then the received signal R is processed to obtain the original data based on the first system parameter group in the baseband unit 13. Moreover, in the baseband unit 13, the transmission signal T of the predetermined time slot of the uplink generated from a transmission-target data based on the first system parameter group is amplified to predetermined power (for example, 0.2 [W]) by the first transmission power amplifier 152 for the terrestrial system, and then the transmission signal T is transmitted from the first antenna 11 to the terrestrial cellular base station 20 by the predetermined time slot.

On the other hand, when the satellite system is selected, the received signal R of the predetermined time slot of the downlink from the artificial geostationary satellite 40 received by the second antenna 12 is amplified with the reception power amplifier 151, and then the received signal R is processed to obtain the original data based on the second system parameter group in the baseband unit 13. Moreover, in the baseband unit 13, the transmission signal T of the predetermined time slot of the uplink generated from the transmission-target data based on the second system parameter group is amplified to predetermined power (for example, 0.1 [W]) by the second transmission power amplifier 153 for the satellite system, and then the transmission signal T is transmitted from the second antenna 12 to the artificial geostationary satellite 40 by the predetermined time slot.

As described above, in the communication terminal apparatus 10 of the configuration example of FIG. 2, since the dedicated antennas 11 and 12 are used and the optimized first or second system parameter groups can be used in the baseband unit 13 according to the mobile communication system selected from the terrestrial system and the satellite system, it is capable of performing the radio communication corresponding to the radio transmission environment of the selected mobile communication system. Moreover, by switching the antennas 11 and 12 and the system parameter groups, the terrestrial system and the satellite system can be easily switched. Further, since the baseband unit 13 for processing the received signal R and the transmission signal T based on the system parameter groups can be shared in the terrestrial system and the satellite system, it is possible to have a simple configuration as compared with a configuration in which a dedicated baseband unit is provided for each of the terrestrial system and the satellite system.

Especially, in the communication terminal apparatus 10 of the configuration example of FIG. 2, since the dedicated transmission power amplifier 152 and 153 can be used according to the mobile communication system selected from the terrestrial system and the satellite system, it is capable of amplifying the power of transmission signal T corresponding to the radio transmission environment of the selected mobile communication system without adjusting the gain of the amplifier, and the optimal power amplifier with low power consumption can be used in consideration of power efficiency. Moreover, since the reception power amplifier 151 can be shared in both of the terrestrial system and the satellite system, a simpler configuration can be achieved.

Figure 3:
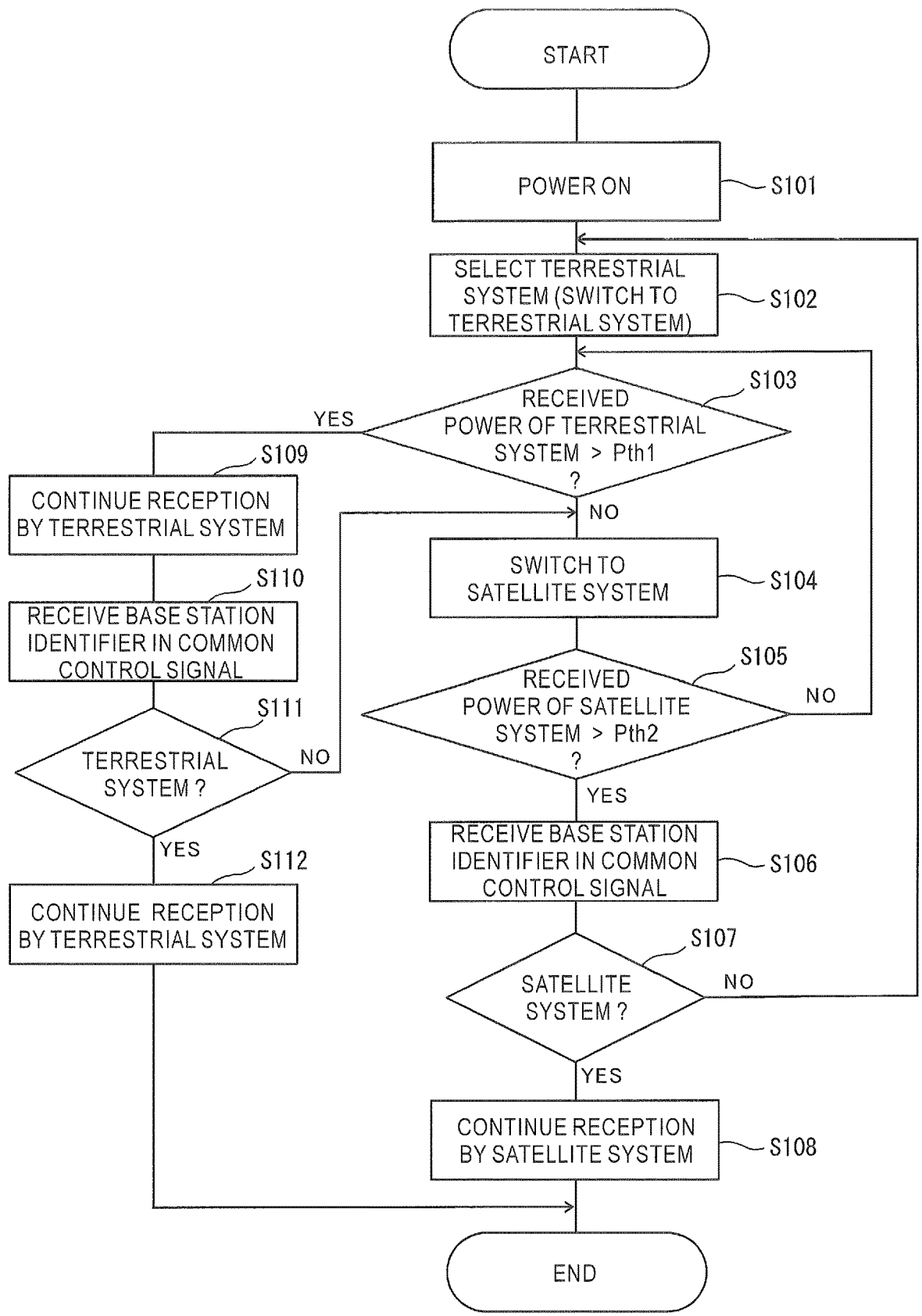
FIG. 3 is a flowchart showing an example of a selection/switching process of a terrestrial system and a satellite system in a communication terminal apparatus according to the present embodiment.

FIG. 3 is a flowchart showing an example of the selection/switching process of the terrestrial system and the satellite system in the communication terminal apparatus according to the present embodiment. In FIG. 3, when the communication terminal apparatus 10 is powered on (S101), the terrestrial system is selected (S102) and it is switched to the antenna 11 and the first system parameter group for the terrestrial system. Next, it is determined whether or not the power (received power) of the received signal received from the terrestrial cellular base station 20 of the terrestrial system is larger than a predetermined first threshold value Pth1 (S103). When the received power of the terrestrial system is smaller than or equal to the first threshold value Pth1 (NO in S103), the terrestrial system is switched to the satellite system (S104), and it is switched to the antenna 12 and the second system parameter group for the satellite system.

Next, it is determined whether or not the received power received from the artificial geostationary satellite 40 of the satellite system is larger than a predetermined second threshold value Pth2 (S105). When the received power of the satellite system is larger than the second threshold value Pth2 (YES in S105), a base station identifier in the common control signal included in the received signal is received (S106), and it is determined whether or not the received signal is the received signal of the satellite system based on the base station identifier (S107). Herein, when it is determined that the received signal is the received signal of the satellite system (YES in S107), the reception by the satellite system is continued (S108). On the other hand, when it is determined that the received signal is not the received signal of the satellite system (NO in S107), it is switched to the terrestrial system (S102).

In the step S103, when the received power of the terrestrial system is larger than the first threshold value Pth1 (YES in S103), the reception by the terrestrial system is continued (S109). Next, the base station identifier in the common control signal included in the received signal is received (S110), it is determined whether or not the received signal is the received signal of the terrestrial system based on the base station identifier (S111). Herein, when it is determined that the received signal is the received signal of the terrestrial system (YES in S111), the reception by the terrestrial system is continued (S112). On the other hand, when it is determined that the received signal is not the received signal of the terrestrial system (NO in S111), it is switched to the satellite system (S104).

According to the selection/switching process of the terrestrial system and the satellite system in FIG. 3, the terrestrial system with more stable radio transmission environment in the normal condition can be used preferentially, and it is capable of automatically switching to the satellite system when the received signal from the terrestrial system become weak for some reason.

It is noted that, in the selection/switching process of the terrestrial system and the satellite system in FIG. 3, in the step S103, it is determined whether or not the received power received from the terrestrial cellular base station 20 of the terrestrial system is larger than the first threshold value Pth1, however, it may be determined whether or not the received power is equal to or larger than the first threshold value Pth1. Moreover, in the step S105, it is determined whether or not the received power received from the artificial geostationary satellite 40 of the satellite system is larger than the second threshold value Pth2, however, it may be determined whether or not the received power is equal to or larger than the second threshold value Pth2.

Next, radio resource allocations in a satellite system with multi-beam antenna configuration forming a mobile communication system according to the present embodiment will be described.

Figure 4A:
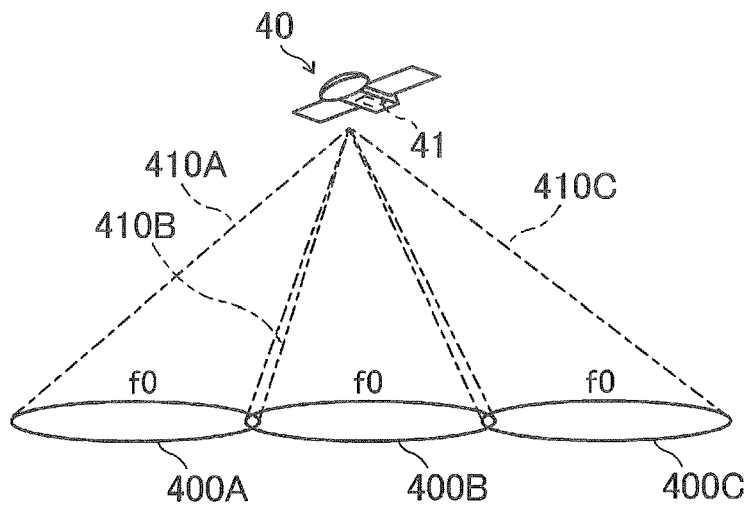
FIG. 4A is an illustration showing a configuration example of a satellite station area (beam area) where a communication relay apparatus of an artificial satellite according to the present embodiment communicates with a terrestrial communication terminal apparatus.
Figure 4B:
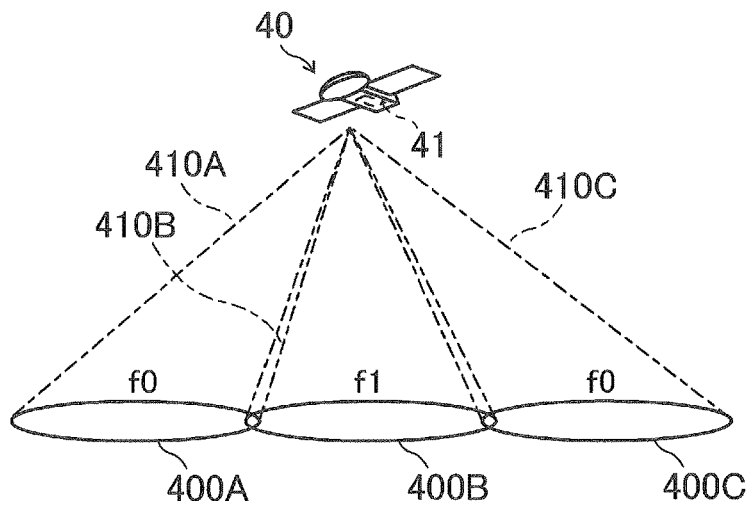
FIG. 4B is an illustration showing a configuration example of a satellite station area (beam area) where a communication relay apparatus of an artificial satellite according to a comparative example communicates with a terrestrial communication terminal apparatus.
Figure 4C:
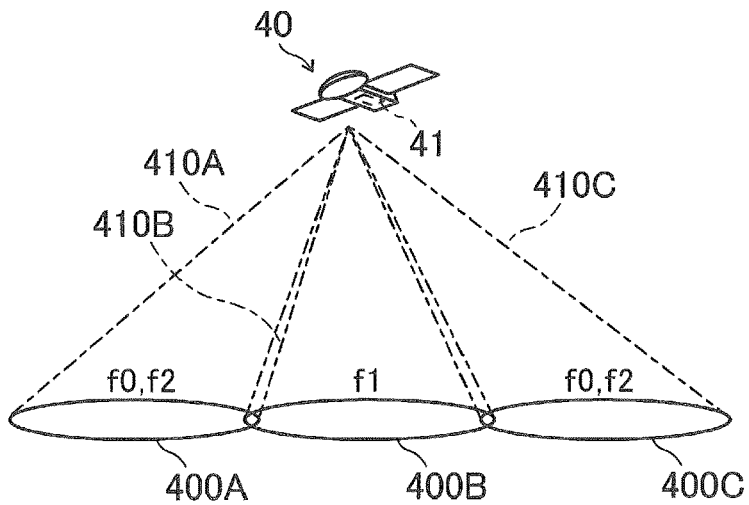
FIG. 4C is an illustration showing a configuration example of a satellite station area (beam area) where a communication relay apparatus of an artificial satellite according to a comparative example communicates with a terrestrial communication terminal apparatus.

FIG. 4A is an illustration showing a configuration example of a satellite station area (beam area) where a communication relay apparatus of an artificial satellite according to the present embodiment communicates with a terrestrial communication terminal apparatus. Each FIG. 4B and FIG. 4C is an illustration showing a configuration example of a satellite station area (beam area) where a communication relay apparatus of an artificial satellite according to a comparative example communicates with a terrestrial communication terminal apparatus. It is noted that, FIG. 4 illustrates the case where the number of the satellite station areas (beam areas) is 3, however, the number of the satellite station areas (beam areas) may be 2, 4 or more.

In FIG. 4A to FIG. 4C, the satellite station areas where the communication relay apparatus 41 of the artificial satellite 40 can communicate with the communication terminal apparatus 10 is a plurality of spatially displaced beam areas 400A, 400B and 400C corresponding to beams 410A, 410B and 410C indicating a plurality of different oriented directions of the antenna of the communication relay apparatus 41.

In the satellite system according to the present embodiment shown in FIG. 4A, by using different time slots between beam areas adjacent to each other as described later, the communication relay apparatus 41 can communicate with the communication terminal apparatus 10 located in each of the beam areas 400A, 400B, and 400C at a predetermined same frequency f0. Since the same frequency can be repeatedly reused by the plurality of mutually different beams 410A, 410B and 410C in this way, it is possible to improve the spectral efficiency (increase the number of simultaneously accommodated users). Further, the antenna gain can be increased.

On the other hand, in the satellite systems of the comparative examples shown in FIG. 4B and FIG. 4C, an example in which the same frequency f0 is repeated every two beams is shown. Whether to repeat the same frequency for each beam is set in accordance with, for example, the directivity of the beam (side lobe characteristics or the like). As the repetition number of beams repeating the same frequency is smaller, the spectral efficiency improves. Moreover, in the comparative examples shown in FIG. 4B and FIG. 4C, the frequency allocated to the satellite system is divided into N or more (hereinafter, each divided frequency is referred to as "channel" as appropriate), and the number of channels fixedly allocated to each of the beams 410A to 410C (beam areas 400A to 400C) is changed according to the traffic amount in each of the beam areas 400A to 400C covered by each of the beams 410A to 410C. For example, in the comparative example of FIG. 4B, since the traffic amount in the beam areas 400A to 400C are almost same, the channels (f0, f1) are fixedly allocated to the beams 410A to 410C one by one. On the other hand, in the comparative example shown of FIG. 4C, since the traffic amount in the beam areas 400A, 400C is larger than the traffic amount in the beam area 400B, one channel (f1) is fixedly allocated to the beam 410B, and two channels (f0, f2) are fixedly allocated to beams 410A, 410C, respectively.

Figure 5A:
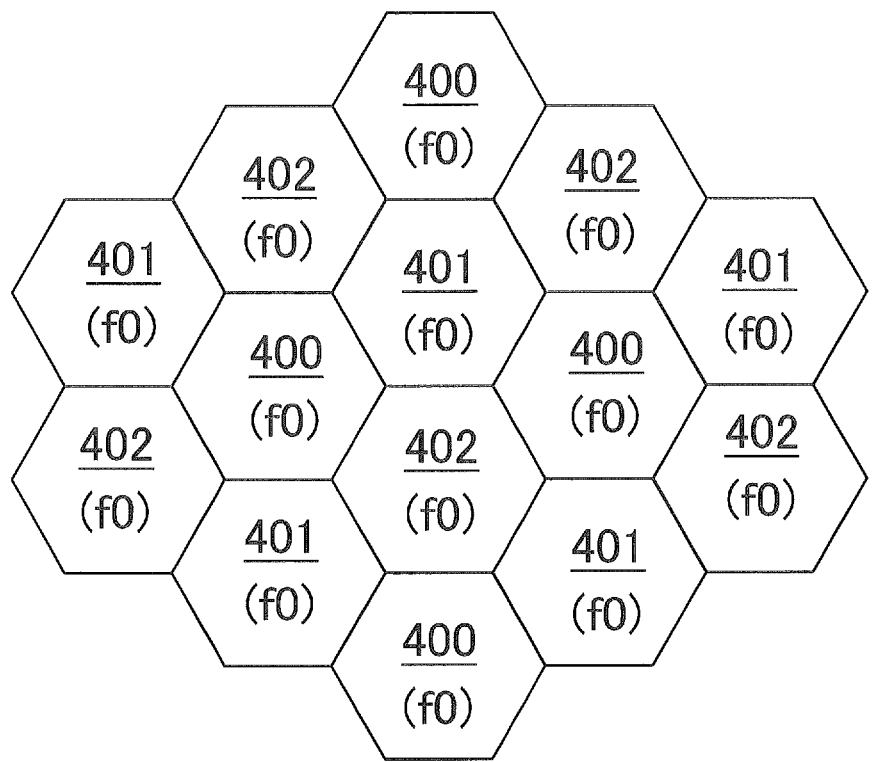
FIG. 5A is an illustration showing a configuration example of a two-dimensionally distributed satellite station area (beam area) in the satellite system according to the present embodiment.
Figure 5B:
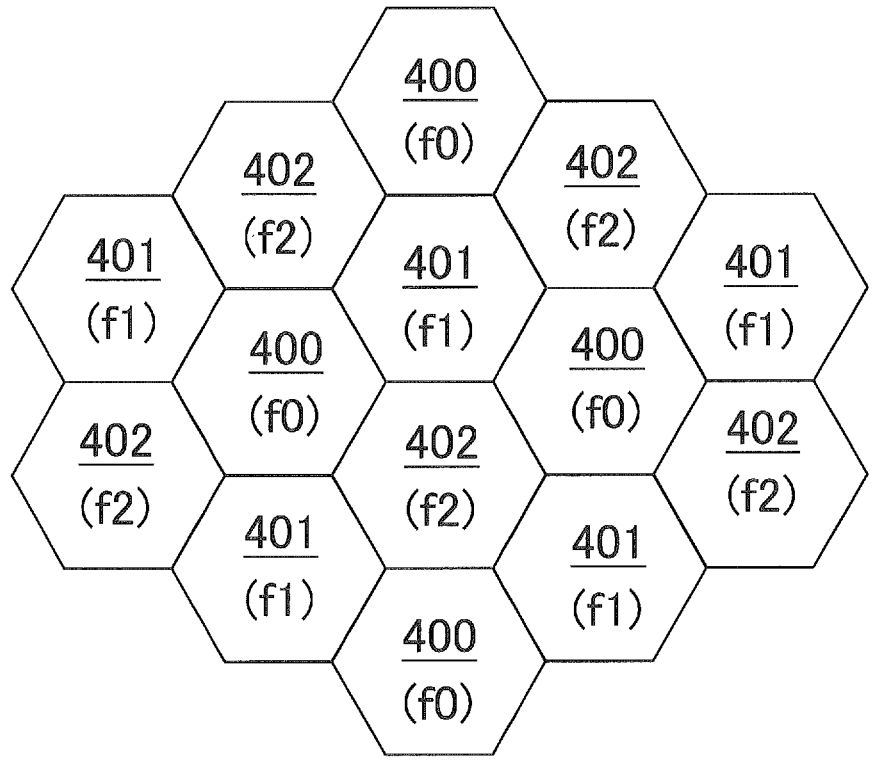
FIG. 5B is an illustration showing a configuration example of a two-dimensionally distributed satellite station area (beam area) in the satellite system according to a comparative example.

FIG. 5A is an illustration showing a configuration example of a two-dimensionally distributed satellite station areas (beam areas) in the satellite system according to the present embodiment, and FIG. 5B is an illustration showing a configuration example of a two-dimensionally distributed satellite station areas (beam areas) in the satellite system according to a comparative example. In the example of FIG. 5, the artificial geostationary satellite 40 has a multi-beam antenna configuration indicating a number of mutually different oriented directions, the satellite station area where the communication relay apparatus 41 of the artificial geostationary satellite 40 can communicate with the communication terminal apparatus 10 is a plurality of beam areas, which are two-dimensionally distributed and spatially displaced from each other, corresponding to the beams indicating a plurality of different oriented directions of the antenna of the communication relay apparatus 41. In the example of FIG. 5, for example, a plurality of beam areas are two-dimensionally arranged so as to cover all over Japan including remote islands.

In the satellite system according to the present embodiment shown in FIG. 5A, by using different time slots between the beam areas adjacent to each other as described later, the communication relay apparatus 41 can communicate with the communication terminal apparatus 10 located in all of the beam areas 401 to 403 at a predetermined same frequency f0. Since the same frequency can be repeatedly reused with a plurality of mutually different beams in this way, it is possible to improve the spectral efficiency (increase the number of simultaneously accommodated users). Further, the antenna gain can be increased.

On the other hand, in the satellite system of the comparative example shown in FIG. 5B, the beam areas using the same frequency are arranged so as not to be adjacent to each other. For example, the beam area 400 using the frequency f0, the beam area 401 using the frequency f1 and the beam area 402 using the frequency f2 are repeatedly and two-dimensionally arranged so that the beam areas using the same frequency are not adjacent to each other. In the satellite system of the comparative example shown in FIG. 5B, the number of channels fixedly allocated to each of the beams (beam areas 400 to 402) is also changed according to the traffic amount in each of the beam area 400 to 402.

As shown in FIG. 4B, FIG. 4C and FIG. 5B, in the satellite system according to the comparative example, the number of channels fixedly allocated to each of the beams is changed according to the traffic amount in the beam area covered by each of the beams. However, since the control to change the number of channels allocated to each of the beams in accordance with the traffic amount in the beam area is a complicated control, it may not be capable of following the fluctuation of the traffic amount at high speed.

Therefore, in the satellite system of the multi-beam antenna configuration of the present embodiment, the time slots are allocated to each of the two or more beam so as not to overlap with each other between the adjacent beams. And then, based on the allocation information on the time slots, when the communication terminal apparatus 10 is located in the beam area covered by any one of the beams of the satellite system, the communication terminal apparatus 10 performs a radio communication of the satellite system by using the time slot allocated to the beam covering the beam area.

Figure 6A:
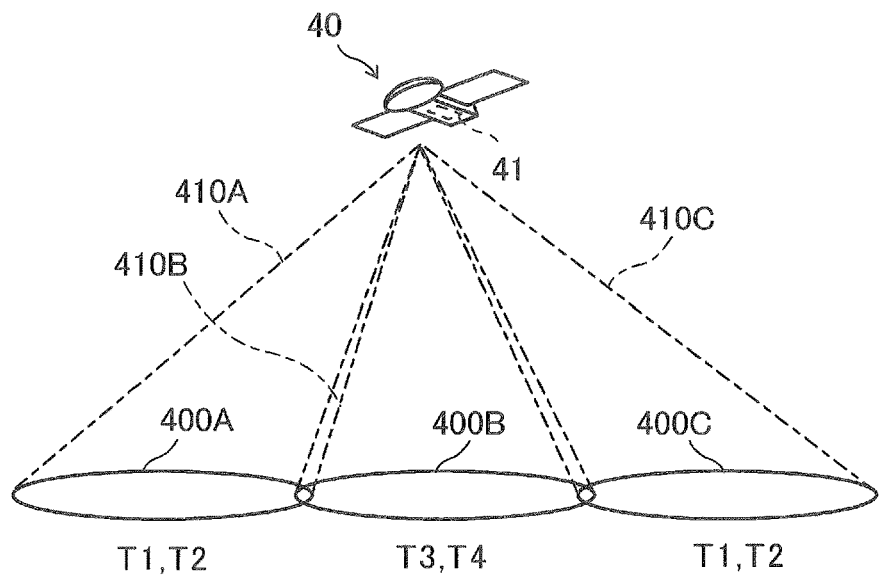
FIG. 6A is an illustration showing an example of relationship between each beam area and time slots in a satellite system with a multi-beam antenna configuration of the present embodiment.
Figure 6B:
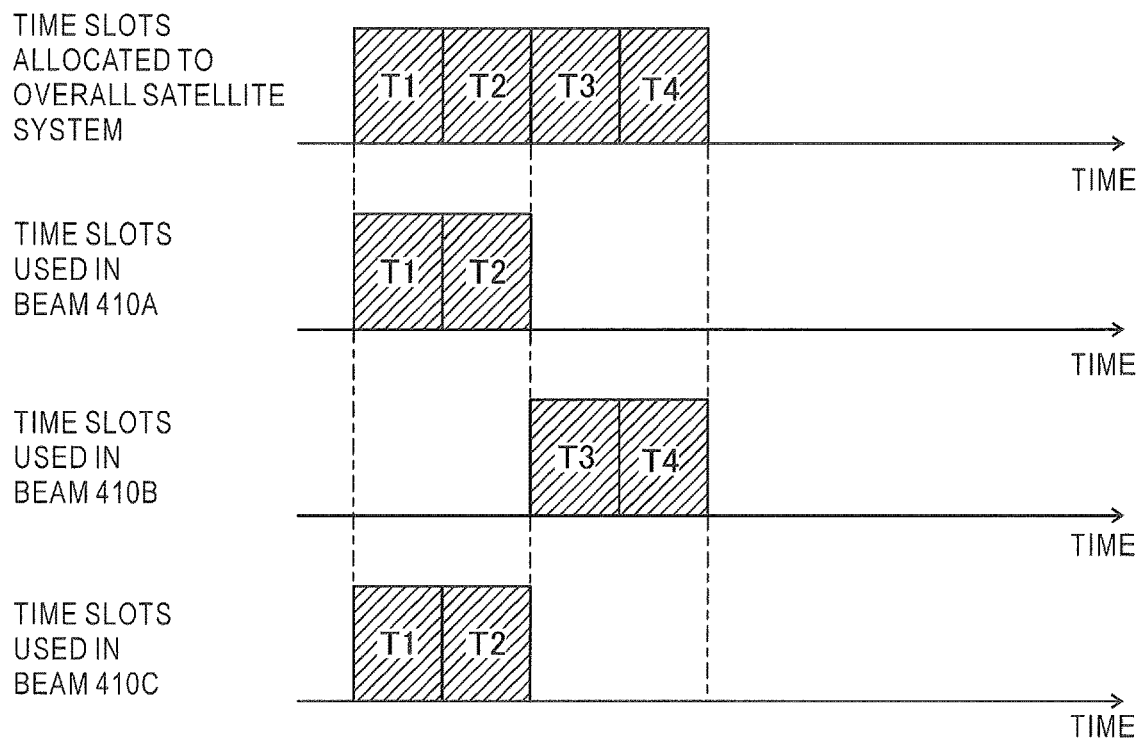
FIG. 6B is an illustration of time slots used in each beam area.

FIG. 6A is an illustration showing an example of relationship between each of the beam areas and time slots in a satellite system with a multi-beam antenna configuration of the present embodiment, and FIG. 6B is an illustration of time slots used in each beam area.

In the example of FIG. 6, for the time slots T1 to T4 allocated to the satellite system, the time slots to be used in each of the beams 410A to 410C are determined and allocated so that the same time slot repeats every two beams and does not overlap between the adjacent beams. For example, as shown in the figure, the time slots are allocated so that the time slots T1 and T2 among the time slots T1 to T4 allocated to the satellite system are used in the beams 410A and 410C, and the time slots T3 and T4 are used in the beam 410B. When the communication terminal apparatus 10 is located in the beam areas 400A to 400C covered by any one of the two of more beams 410A to 410C of the satellite system, the communication terminal apparatus 10 performs a radio communication of the satellite system using the time slots allocated to the beams covering the beam area in which the communication terminal apparatus 10 is located.

In the example of FIG. 6, the time slots allocated to the beam covering the beam area in which the communication terminal apparatus 10 is located not only does not overlap with the time slots allocated to the terrestrial system, but also does not overlap with the time slots allocated to the beam adjacent to the beam of the beam area. Accordingly, it is possible to avoid the interference due to signals of the terrestrial system and to avoid the interference due to signals in the adjacent beams of the satellite system. Furthermore, since the radio resources of the satellite system, which is controlled so as to switch between the mutually adjacent beams in the satellite system, are easily controllable time slots, the switching control of radio resources is easier than when a control is performed so as to switch frequencies.

Figure 7A:
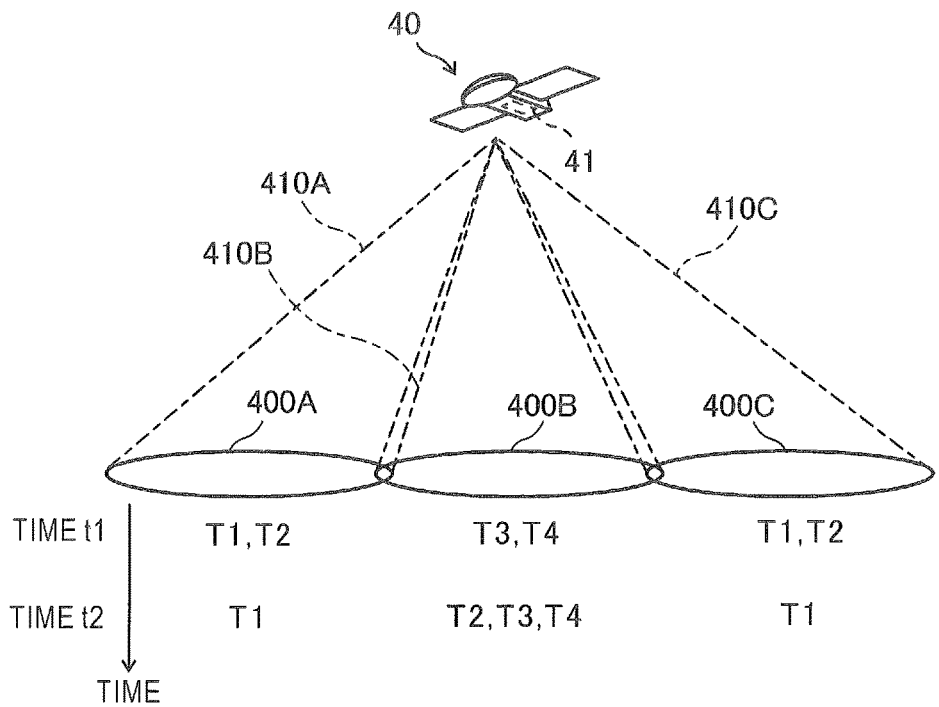
FIG. 7A is an illustration showing another example of relationship between each beam area and time slots in a satellite system with a multi-beam antenna configuration of the present embodiment.
Figure 7B:
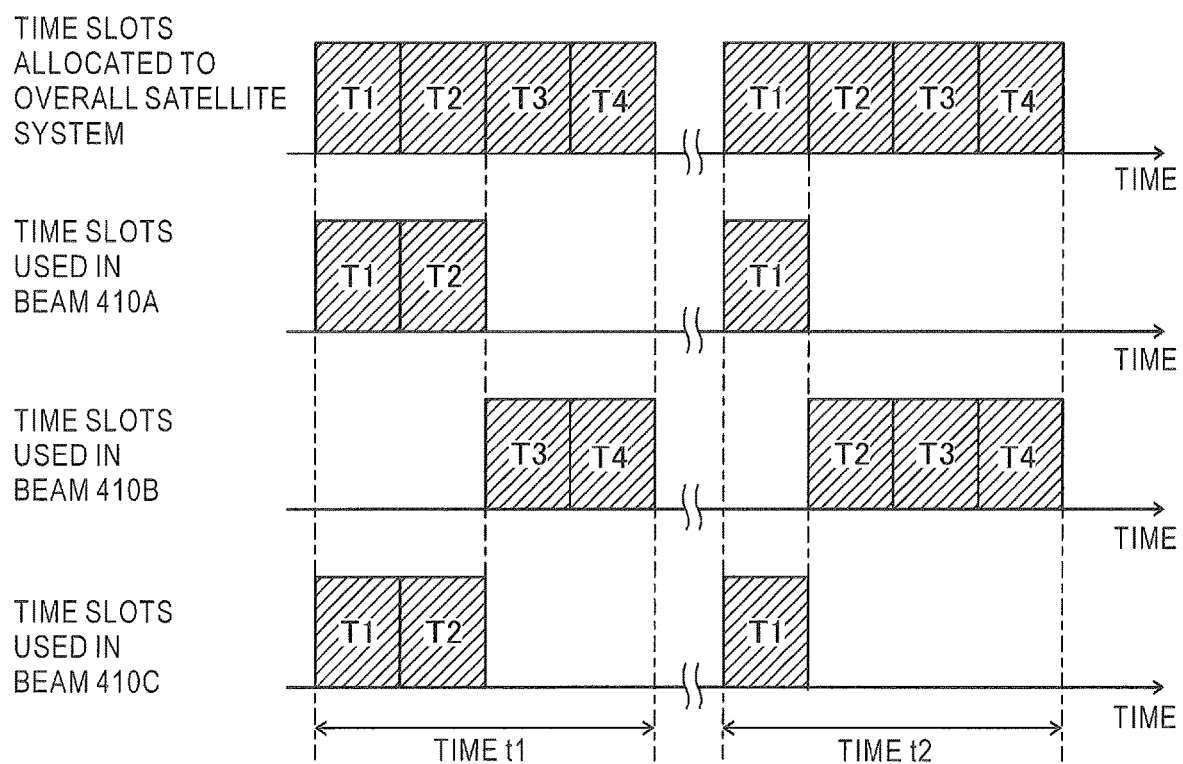
FIG. 7B is an illustration of time slots used in each beam area.

FIG. 7A is an illustration showing another example of relationship between each of the beam areas and time slots in a satellite system with a multi-beam antenna configuration of the present embodiment, and FIG. 7B is an illustration of time slots used in each beam area.

In the example of FIG. 7, time slots used by each beam of the satellite system are allocated temporally and adaptively. For example, at a certain time t1, as in the example in FIG. 6, time slots are allocated so that the time slots T1 and T2 are used in the beams 410A and 410C and the time slots T3 and T4 are used in the beam 410B, among the time slots T1 to T4 allocated to the satellite system. At the subsequent time t2, when the traffic amount in the beam area 400B covered with the central beam 410B is increased more than that in the beam areas 400A, 400C on both sides thereof, time slot allocation is changed so that only the time slot T1 is used in the beams 410A and 410C, and the time slots T2, T3 and T4 are used in the beam 410B. When the traffic amount in the beam area covered by any one of the beams of the satellite system is large like this, by increasing the number of time slots allocated to the beam of the beam area, it is possible to increase the spectral efficiency in the beam area so as to cope with the increase in traffic amount. Moreover, when the traffic amount in the beam area covered by any one of the beams of the satellite system is small, by reducing the number of time slots allocated to the beam of that beam area, unnecessary allocation of time slots can be avoided.

Figure 8A:
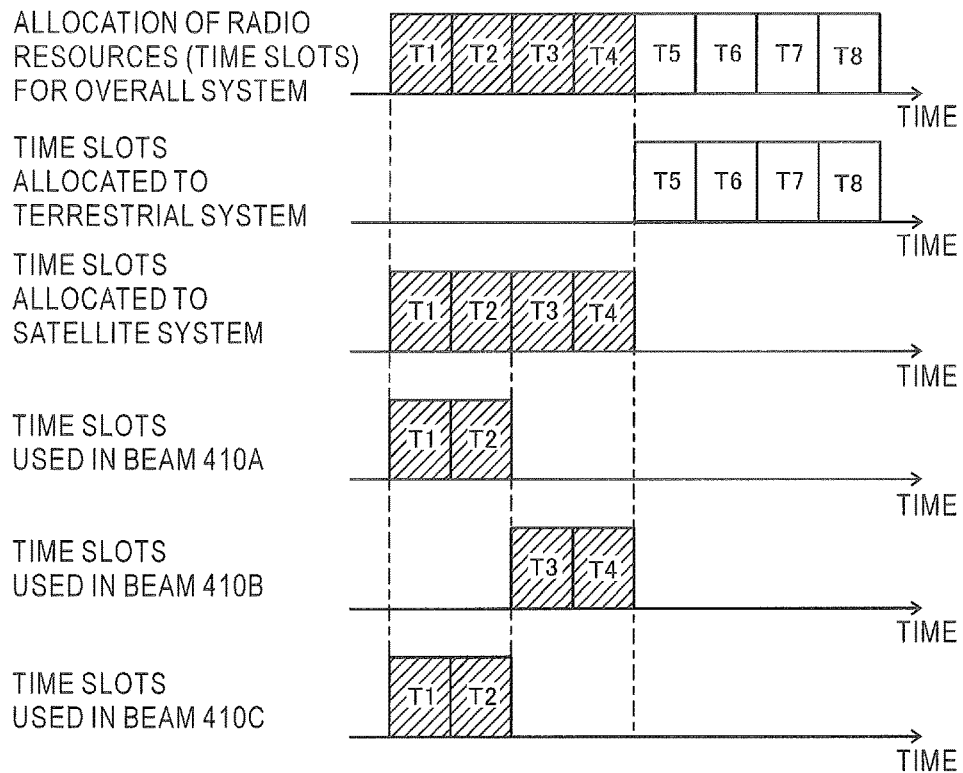
FIG. 8A is an illustration showing an example of time slots allocated to each of the satellite system and the terrestrial system before the traffic amount increases in the satellite system with the multi-beam antenna configuration of the present embodiment.
Figure 8B:
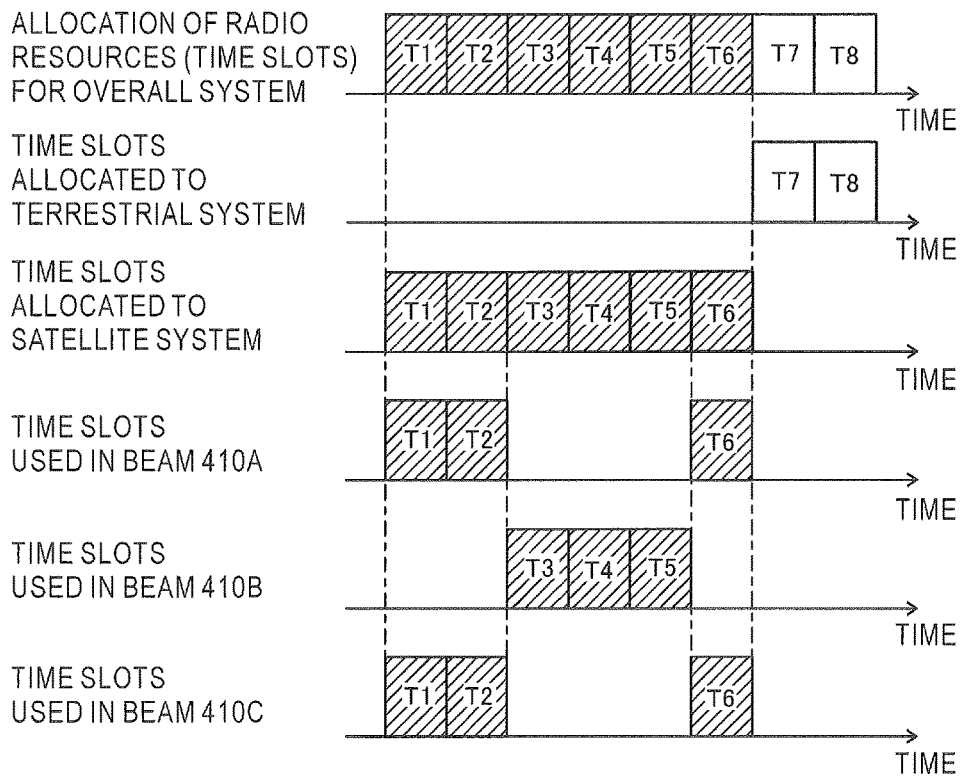
FIG. 8B is an illustration showing an example of time slots allocated to each of the satellite system and the terrestrial system after the traffic amount increases in the satellite system.

FIG. 8A is an illustration showing an example of time slots allocated to the satellite system and the terrestrial system respectively before the traffic amount increases in the satellite system with the multi-beam antenna configuration of the present embodiment. FIG. 8B is an illustration showing an example of time slots allocated to the satellite system and the terrestrial system respectively after the traffic amount increases in the satellite system.

In the example of FIG. 8, when the traffic amount increases in each of the beam area 400A to 400C using the satellite system, the number of time slots allocated to the overall satellite system is increased from four to six. Accordingly, it is possible to increase the spectral efficiency so as to cope with the increase in traffic amount in the satellite system. Further, when the traffic amount decreases in at least one of the beam areas 400A to 400C using the satellite system, by reducing the number of time slots allocated to the overall satellite system and the beam area, unnecessary allocation of time slots can be avoided.

As described above, according to the present embodiment, it can be shared in the terrestrial system and the multi-beam type of satellite system, and it is possible to avoid the interference between the beams in the satellite system while avoiding the interference between both systems by the simple switching control of the radio resources.

It is noted that, the process steps and configuration elements in the mobile communication system, the base station, the communication terminal apparatus (user terminal equipment, mobile station) and the components of the router device described in the present specification can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, communication terminal apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10 communication terminal apparatus
20 terrestrial cellular base station 30 satellite base station
40 artificial geostationary satellite
41 communication relay apparatus
50 base-station control apparatus
60 core network
200 terrestrial station area
400 satellite station area
410 beam

The invention claimed is:

1. A communication terminal apparatus shared in a terrestrial cellular mobile communication system and a multi-beam type of satellite mobile communication system, comprising:
   memory means for memorizing allocation information on time slots of radio resources allocated to the terrestrial cellular mobile communication system and the satellite mobile communication system in which a same frequency band is used, so as not to overlap with each other between the systems and allocated to each of two or more beams of the satellite mobile communication system so as not to overlap each other between adjacent beams;
   a plurality of radio communication components that collectively perform radio communications; and
   a control apparatus that controls one or more of the plurality of radio communication components to perform a radio communication, the controlling including:
      selecting a terrestrial cellular mobile communication method to perform a radio communication when using the terrestrial cellular mobile communication system, and selecting a satellite mobile communication method to perform a radio communication when using the satellite mobile communication system;
      controlling to perform a radio communication of the satellite mobile communication system by using time slots allocated to a beam covering a beam area when the communication terminal apparatus is located in the beam area covered by the beam that is one of the two or more beams of the satellite mobile communication system, based on the allocation information on the time slots of radio resources;
      controlling to perform a radio communication by the terrestrial cellular mobile communication system when a power of a signal received from a terrestrial cellular base station of the terrestrial cellular mobile communication system is larger than a predetermined threshold value;
      controlling to switch from the terrestrial cellular mobile communication system to the satellite mobile communication system and perform a radio communication by the satellite mobile communication system, when the power of a signal received from the terrestrial cellular base station is smaller than or equal to the predetermined threshold value; and
      controlling to switch from the satellite mobile communication system to the terrestrial cellular mobile communication system when it is determined from a base station identifier in a common control signal included in a signal received at the communication terminal apparatus that the received signal is not from the satellite mobile communication system.

2. The communication terminal apparatus according to claim 1, wherein the control apparatus controls so as to change the number of time slots corresponding to each of the two or more beams of the satellite mobile communication system in accordance with a traffic amount in the beam area covered by each of the beams.

3. The communication terminal apparatus according to claim 1, wherein the control apparatus controls so as to change the number of time slots allocated to each of the terrestrial cellular mobile communication system and the satellite mobile communication system according to a traffic amount of at least one of the terrestrial cellular mobile communication system and the satellite mobile communication system.

4. The communication terminal apparatus according to claim 1, wherein the plurality of radio communication components includes:
   first components for the radio communications over the terrestrial cellular mobile communication system; and
   second components, physically separate and discrete from first components, for radio communications over the satellite mobile communication system.

5. The communication terminal apparatus according to claim 1, wherein the first components include a first antenna for radio communication with the terrestrial cellular base station, wherein the second components include a second antenna for radio communication with an artificial satellite of the satellite mobile communication system and wherein the communication terminal apparatus includes a switch for selecting the first switch or the second switch for radio communications.

6. A satellite base station capable of communicating with a communication terminal apparatus in a mobile communication system including terrestrial cellular mobile communication system and satellite mobile communication system via a communication relay device of an artificial satellite, comprising:
   memory means for memorizing allocation information on time slots of radio resources allocated to the terrestrial cellular mobile communication system and the satellite mobile communication system in which a same frequency band is used, so as not to overlap with each other between the systems, and allocated to each of two or more beams of the satellite mobile communication system so as not to overlap with each other between adjacent beams;
   a plurality of radio communication components that collectively perform a radio communication with a communication terminal apparatus located in a beam area covered by one of beams of an own base station by a satellite mobile communication method; and
   a base station apparatus that controls one or more the plurality of radio communication components to:
      perform a radio communication of the satellite mobile communication system by using time slots allocated to a beam covering a beam area when the communication terminal apparatus is located in the beam area covered by the beam that is one of the plurality of beams of the satellite mobile communication system, based on the allocation information on the time slots of radio resource;
      perform a radio communication by the terrestrial cellular mobile communication system when a power of a signal received by the communication terminal apparatus from a terrestrial cellular base station of the terrestrial cellular mobile communication system is larger than a predetermined threshold value;
      switch from the terrestrial cellular mobile communication system to the satellite mobile communication system and perform a radio communication by the satellite mobile communication system, when the power of a signal received from the terrestrial cellular base station is smaller than or equal to the predetermined threshold value; and switch from the satellite mobile communication system to the terrestrial cellular mobile communication system when it is determined from a base station identifier in a common control signal included in a signal received at the communication terminal apparatus that the received signal is not from the satellite mobile communication system.

7. The satellite base station according to claim 6, wherein the base station apparatus controls so as to change the number of time slots corresponding to each of the two or more beams of the satellite mobile communication system in accordance with a traffic amount in the beam area covered by each of the beams.

8. The satellite base station according to claim 6, wherein a plurality of radio communication components includes:
   a frequency converting apparatus that converts between a frequency of radio communication used by the base station apparatus and a frequency of radio communication used by an artificial satellite of the satellite mobile communication system.

9. A mobile communication system including a terrestrial cellular mobile communication system and a satellite mobile communication system, comprising:
   a terrestrial cellular base station capable of performing a radio communication with a communication terminal apparatus;
   a satellite base station capable of performing a radio communication with a communication terminal apparatus via a communication relay apparatus of an artificial satellite; and
   a base-station control apparatus that controls the terrestrial cellular base station and the satellite base station,
   wherein the satellite base station is the satellite base station according to claim 6 or 7.

10. A base-station control apparatus for controlling a terrestrial cellular base station capable of performing a radio communication with a communication terminal apparatus and a satellite base station capable of performing a radio communication with a communication terminal apparatus via a communication relay apparatus of the artificial satellite in a mobile communication system including a terrestrial cellular mobile communication system and a satellite mobile communication system,
   wherein a same frequency band is used for a radio communication in each of the terrestrial cellular mobile communication system and the satellite mobile communication system, and
   wherein the base-station control apparatus comprises:
     a memory having a program stored thereon including instructions that define controlling:
       allocating time slots of radio resources used in the terrestrial cellular mobile communication system and time slots of radio resources used in the satellite mobile communication system so as not to overlap with each other between the systems;
       allocating time slots corresponding to each of two or more beams of the satellite mobile communication system so as not to overlap with each other between adjacent beams;
       performing a radio communication by the terrestrial cellular mobile communication system when a power of a signal received by the communication terminal apparatus from the terrestrial cellular base station of the terrestrial cellular mobile communication system is larger than a predetermined threshold value;
       switching the terrestrial cellular mobile communication system to the satellite mobile communication system and performing a radio communication by the satellite mobile communication system, when the power of a signal received from the terrestrial cellular base station is smaller than or equal to the predetermined threshold value; and
       switching from the satellite mobile communication system to the terrestrial cellular mobile communication system when it is determined from a base station identifier in a common control signal included in a signal received at the communication terminal apparatus that the received signal is not from the satellite mobile communication system, and
     a processor that executes the program to perform the control.

11. The base-station control apparatus according to claim 10, wherein the program includes instructions that define controlling changing the number of time slots allocated corresponding to each of the two or more beams of the satellite mobile communication system in accordance with a traffic amount in the beam area covered by each of the beams.

12. The base-station control apparatus according to claim 10, wherein the program includes instructions that define controlling changing the number of time slots allocated to each of the terrestrial cellular mobile communication system and the satellite mobile communication system according to a traffic amount in at least one of the terrestrial cellular mobile communication system and the satellite mobile communication system.

13. A mobile communication system including a terrestrial cellular mobile communication system and a satellite mobile communication system, comprising:
   a terrestrial cellular base station capable of performing a radio communication with a communication terminal apparatus;
   a satellite base station capable of performing a radio communication with a communication terminal apparatus via a communication relay apparatus of an artificial satellite; and
   a base-station control apparatus according to claim 10.

14. A method of operating a communication terminal apparatus, comprising:
   allocating first time slots to radio resources of a terrestrial cellular mobile communication system that use a particular frequency band;
   allocating second time slots that do not overlap with the first time slots to radio resources of a satellite mobile communication system that use the particular frequency band; if the communication terminal apparatus is in an overlapping coverage area of the terrestrial cellular mobile communication system and the satellite mobile communication system and a strength of a signal received at the communication terminal apparatus from the terrestrial cellular mobile communication system is larger than a predetermined threshold value, performing a radio communication on the terrestrial cellular mobile communication system using the first time slots; and
   if the communication terminal apparatus is in an overlapping coverage area of the terrestrial cellular mobile communication system:

if the satellite mobile communication system and the strength of the signal is smaller than or equal to the predetermined threshold value, switching the terrestrial cellular mobile communication system to the satellite mobile communication system and performing a radio communication on the satellite mobile communication system using the second time slots, and if it is determined from a base station identifier in a common control signal included in a signal received at the communication terminal apparatus that the received signal is not from the satellite mobile communication system, switching from the satellite mobile communication system to the terrestrial cellular mobile communication system.

15. The method according to claim 14, wherein the second time slots are allocated to each of two or more beams of the satellite mobile communication system so as not to overlap with each other between adjacent beams.

16. The method according to claim 15, wherein performing the radio communication on the satellite mobile communication system using the second time slots includes using slots of the second time slots allocated to a first beam of the two or more beams, the first beam covering a beam area in which the communication terminal apparatus is located.

17. The method according to claim 15, further comprising:
changing a quantity of second time slots corresponding to each of the two or more beams of the satellite mobile communication system in accordance with a traffic amount in the beam area covered by each of the beams.

18. The method according to claim 14, further comprising:
changing a quantity of first time slots and second time slots allocated to the terrestrial cellular mobile communication system and the satellite mobile communication system, respectively, according to a traffic amount of at least one of the terrestrial cellular mobile communication system and the satellite mobile communication system.

19. The method according to claim 14, wherein performing the radio communication on the terrestrial cellular mobile communication system includes selecting and applying a terrestrial cellular mobile communication method and wherein performing the radio communication on the satellite mobile communication system includes selecting and applying a satellite mobile communication method.

20. The method according to claim 19, further comprising:
storing in memory the terrestrial cellular mobile communication method, the satellite mobile communication method and allocation information about the first time slots and second time slots.

* * * * *